(12) United States Patent
Marushima

(10) Patent No.: US 10,268,348 B2
(45) Date of Patent: Apr. 23, 2019

(54) INFORMATION PROCESSING TERMINAL, INFORMATION PROCESSING METHOD, AND INFORMATION PROCESSING SYSTEM

(71) Applicant: Takayuki Marushima, Chiba (JP)

(72) Inventor: Takayuki Marushima, Chiba (JP)

(73) Assignee: Ricoh Company, Ltd., Tokyo (JP)

(*) Notice: Subject to any disclaimer, the term of this patent is extended or adjusted under 35 U.S.C. 154(b) by 728 days.

(21) Appl. No.: 14/536,777

(22) Filed: Nov. 10, 2014

(65) Prior Publication Data
US 2015/0143261 A1    May 21, 2015

(30) Foreign Application Priority Data

Nov. 18, 2013  (JP) ................................. 2013-237752

(51) Int. Cl.
*G06F 3/0484* (2013.01)
*H04L 29/06* (2006.01)
*G06F 3/0488* (2013.01)

(52) U.S. Cl.
CPC .......... *G06F 3/0484* (2013.01); *G06F 3/0488* (2013.01); *G06F 3/04883* (2013.01); *H04L 65/403* (2013.01); *H04L 65/4015* (2013.01)

(58) Field of Classification Search
CPC .......................... G06F 3/0484; H04L 65/4015
See application file for complete search history.

(56) References Cited

U.S. PATENT DOCUMENTS

| 4,987,411 A | * | 1/1991 | Ishigami | G06F 3/04812 345/157 |
| 5,570,113 A | * | 10/1996 | Zetts | G06F 3/04883 345/156 |

(Continued)

FOREIGN PATENT DOCUMENTS

| JP | 3237339 | 12/2001 |
| JP | 2007-188168 | 7/2007 |

(Continued)

OTHER PUBLICATIONS

Cisco, "WebEx Meeting Center User Guide," May 22, 2013, http://www.cisco.com/c/dam/en/us/td/docs/collaboration/meeting_center/wx_mc_host_ug.pdf.*

(Continued)

*Primary Examiner* — Ryan Barrett
(74) *Attorney, Agent, or Firm* — Harness, Dickey & Pierce, P.L.C.

(57) ABSTRACT

Multiple information processing terminals, among which display data to be displayed on a display screen of one of the information processing terminals can be shared, are disclosed. The information processing terminal includes a rendering unit which renders information on the display data of the information processing terminal based on an operation of a user; a display synchronization unit which renders the information rendered by the rendering unit on the display data displayed on display screens of the information processing terminals other than the information processing terminal; a calculation unit which calculates an information amount based on the information rendered by the rendering unit; and a rendering suppression unit which suppresses rendering of the information on the display data of the information processing terminal by the rendering unit when the information amount is at least a predetermined value.

13 Claims, 9 Drawing Sheets

(56) References Cited

U.S. PATENT DOCUMENTS

| | | | | |
|---|---|---|---|---|
| 5,598,183 | A * | 1/1997 | Robertson | G06F 3/04812 345/157 |
| 5,611,031 | A * | 3/1997 | Hertzfeld | G06F 3/0481 715/740 |
| 5,642,131 | A * | 6/1997 | Pekelney | G06F 3/04812 715/862 |
| 5,870,079 | A * | 2/1999 | Hennessy | G06F 3/04812 345/157 |
| 6,323,884 | B1 * | 11/2001 | Bird | G06F 3/04812 715/810 |
| 6,339,440 | B1 * | 1/2002 | Becker | G06F 3/04892 345/157 |
| 6,527,812 | B1 * | 3/2003 | Bradstreet | G06F 9/4443 715/210 |
| 6,535,897 | B1 * | 3/2003 | Altman | G06K 9/00442 715/203 |
| 6,587,131 | B1 * | 7/2003 | Nakai | G06F 3/04812 715/857 |
| 6,693,653 | B1 * | 2/2004 | Pauly | G06F 3/04812 715/857 |
| 8,555,150 | B1 * | 10/2013 | Ortmanns | G06F 17/24 715/203 |
| 8,743,022 | B2 | 6/2014 | Masuda et al. | |
| 2003/0128244 | A1 * | 7/2003 | Iga | G06F 3/04883 715/863 |
| 2003/0234772 | A1 * | 12/2003 | Zhang | G06F 17/30843 345/177 |
| 2004/0250218 | A1 * | 12/2004 | Wecker | G06F 3/038 715/812 |
| 2008/0024507 | A1 * | 1/2008 | Pelletier-Doyle | G06T 19/00 345/522 |
| 2013/0091440 | A1 * | 4/2013 | Kotler | G06Q 10/10 715/753 |
| 2013/0198653 | A1 * | 8/2013 | Tse | G06F 3/0484 715/751 |
| 2016/0299660 | A1 * | 10/2016 | Au | G06F 3/0481 |

FOREIGN PATENT DOCUMENTS

| | | |
|---|---|---|
| JP | 4087203 | 5/2008 |
| JP | 2010-251919 A | 11/2010 |
| JP | 2011-253307 A | 12/2011 |
| JP | 2012-108872 | 6/2012 |
| WO | WO-2013/073125 A1 | 5/2013 |

OTHER PUBLICATIONS

Meng et al., "Visualizing Histories for Selective Undo and Redo," Jul. 15, 1998, Third Asian Pacific Conference on Computer and Human Interaction, pp. 459-464, http://dl.acm.org/citation.cfm?id=786260.*

Mehra, "Jagged Arrays in C#.NET," Jun. 22, 2009, http://www.c-sharpcorner.com/uploadfile/puranindia/jagged-arrays-in-C-Sharp-net/.*

Smith, "5 Free Annotation and Collaboration Tools for Web Projects," Dec. 23, 2010, http://mashable.com/2010/12/23/free-annotation-collaboration-tools/.*

Cooper et al., "About Face: The Essentials of Interaction Design," 2007, Wiley Publishing Inc.*

FireFileCopy Version 3.9.2, PC Japan Valume 9, No. 4, Japan, Softbank Publishing Co., Ltd., Apr. 1, 2004, vol. 9, No. 4, p. 27, with partial English translation.

Japanese Office Action dated Aug. 15, 2017.

* cited by examiner

FIG.4

| STROKE ID | PAGE NUMBER | COLOR | THICKNESS |
|---|---|---|---|
| S00001 | 2 | BLACK | THICK |
| S00002 | 2 | RED | THIN |
| S00003 | 3 | BLUE | THIN |

FIG.5

| POINT ID | STROKE ID | X COORDINATE | Y COORDINATE |
|---|---|---|---|
| P00001 | S00001 | 10 | 10 |
| P00002 | S00001 | 11 | 12 |
| P00003 | S00001 | 13 | 11 |
| P00004 | S00001 | 18 | 11 |
| P00005 | S00001 | 23 | 10 |
| P00006 | S00002 | 56 | 14 |

INFORMATION PROCESSING TERMINAL, INFORMATION PROCESSING METHOD, AND INFORMATION PROCESSING SYSTEM

TECHNICAL FIELD

The present invention relates to information processing terminals, information processing methods, and information processing systems.

BACKGROUND ART

Related-art electronic conference systems are known which share and display data among multiple information processing terminals via a network.

Information processing terminals for use in such electronic conference systems are known which make it possible to add memo information to displayed data and to share and display the resulting data (see Patent document 1, for example).

Patent document 1: JP4087203B

DISCLOSURE OF THE INVENTION

In light of the above-described background art, an object of an embodiment of the present invention is to provide information processing terminals, information processing methods, and information processing systems that make it possible to suppress rendering of information on displayed data in accordance with an information amount based on information rendered on the displayed data.

According to an embodiment of the present invention, an information processing terminal is provided, wherein the information processing terminal is in multiple number, and wherein display data to be displayed on a display screen of the information processing terminal can be shared among the multiple information processing terminals, the information processing terminal including a rendering unit which renders information on the display data of the information processing terminal based on an operation of a user; a display synchronization unit which renders the information rendered by the rendering unit on the display data displayed on a display screen of the multiple information processing terminals other than the information processing terminal; a calculation unit which calculates an information amount based on the information rendered by the rendering unit; and a rendering suppression unit which suppresses rendering of the information on the display data of the information processing terminal by the rendering unit when the information amount is at least a predetermined value.

The embodiment of the present invention makes it possible to suppress rendering of information on displayed data in accordance with an information amount based on information rendered on the displayed data.

BRIEF DESCRIPTION OF THE DRAWINGS

Other objects, features, and advantages of the present invention will become more apparent from the following detailed descriptions when read in conjunction with the accompanying drawings, in which:

FIG. 4 is a diagram for explaining exemplary stroke information;

FIG. 5 is a diagram for explaining exemplary point information;

BEST MODE FOR CARRYING OUT THE INVENTION

Next, an embodiment of the present invention is described in detail. In the present embodiment, a conference system is described as an example.

System Configuration

Figure 1:
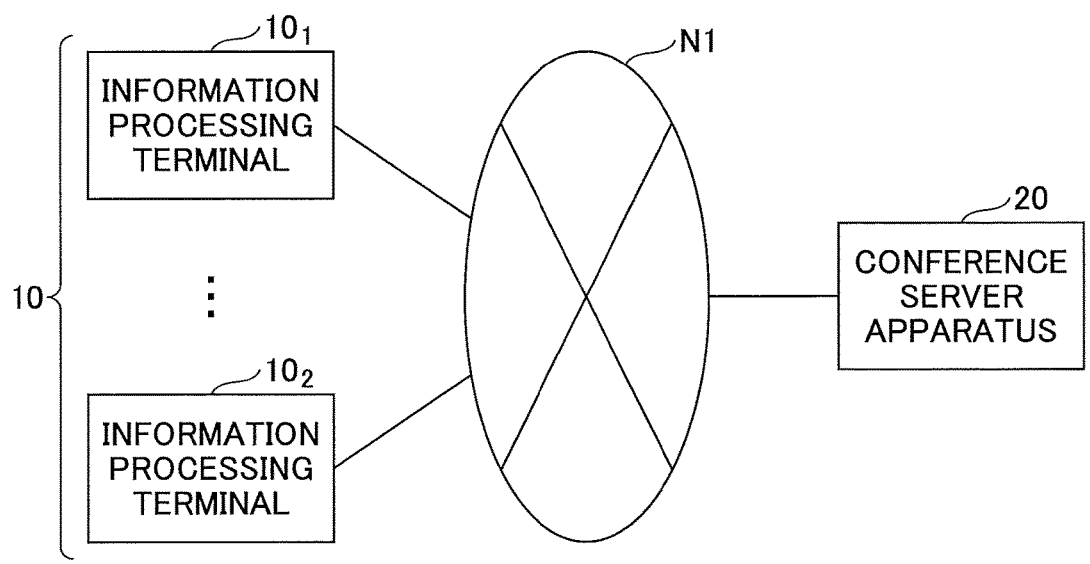
FIG. 1 is a configuration diagram of an exemplary conference system according to the present embodiment.

FIG. 1 is a configuration diagram of an exemplary conference system according to the present embodiment. A conference system 1 in FIG. 1 has one or more information processing terminals 10 and a conference server apparatus 20 connected wireline or wireless to a network N1.

The conference server apparatus 20 may be software or a service which operates on one or more computers. The conference server apparatus 20 may also take a form of a so-called cloud service, for example.

The information processing terminals 10 are devices operated by a user. The information processing terminals 10 may be a PC (personal computer); a tablet terminal; a portable information terminal such as a smartphone, a mobile telephone, a PDA, etc.; a display apparatus such as an electronic whiteboard; a projection apparatus such as a projector, etc., as well as a dedicated conference terminal. The information processing terminals 10 receive (download) conference material from the conference server apparatus 20 to conduct synchronous displaying, asynchronous displaying, etc., of the conference material, etc. Here, the conference material is a set of electronic data such as a document, a chart, etc., that are used in a conference, for example.

A mode in which synchronous displaying of the conference material is performed in the information processing terminals 10 is called a share mode below. In the share mode, the information processing terminals 10 participating in the same conference display the same page of the conference material that is specified by the conference server apparatus 20. Moreover, a mode in which asynchronous displaying of the conference material is performed in the information processing terminals 10 is called an individual mode below. In the individual mode, the information processing terminals 10 participating in the same conference may also temporarily display a page other than the page of the conference material that is specified by the conference server apparatus 20.

Moreover, the information processing terminals 10 may make memo writing on the conference material displayed via a touch panel, a keyboard, etc., for example. The information processing terminals 10 include those in a presenter mode for a presenter of the conference and those in a participant mode for a participant of the conference. When a user performs an operation such as the memo writing, page turning, etc., on the conference material displayed by the information processing terminal 10 in the presenter mode and the share mode, the operation such as the memo writing, the page turning, etc., on the conference material displayed by a different information processing terminal 10 in the participant mode is synchronized therewith.

It is preferable that the number of information processing terminals 10 in the presenter mode in the same conference is one. Moreover, it is preferable to be able to switch the mode of the information processing terminal 10 which is in the presenter mode with an operation of the user.

The conference server apparatus 20 is an apparatus which performs information processing related to the conference. The conference server apparatus 20 transmits the conference material to the information processing terminals 10. Moreover, the conference server apparatus 20 transmits information for causing the operation such as the memo writing, the page turning, etc., that is performed by the information processing terminal 10 in the presenter mode to be synchronized with the different information processing terminals 10. The conference server apparatus 20 includes a WS (workstation), a PC, etc. The conference server apparatus 20 and the respective information processing terminals 10 can mutually communicate using a communications protocol such as TCP/IP, etc., for example. The conference server apparatus 20 saves conference information, user information, etc., that are registered. The conference server apparatus 20 saves the conference material, etc., that are registered by (or uploaded from) the information processing terminals 10.

The conference system 1 in FIG. 1 is merely one example, so that it may be configured to have no conference server apparatus 20.

Hardware Configuration

Figure 2:
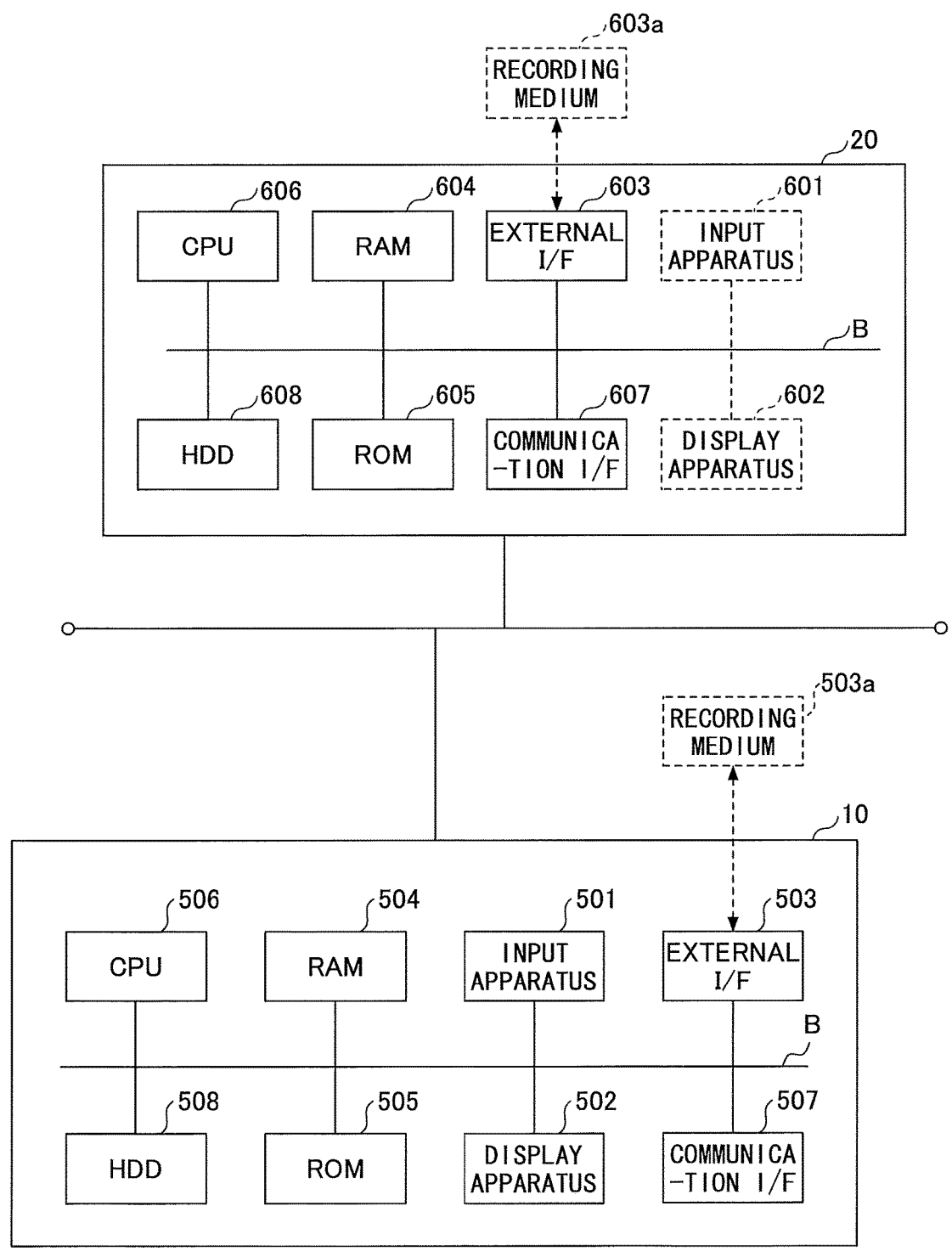
FIG. 2 is a hardware configuration diagram of an exemplary computer system which makes up the conference system according to the present embodiment.

The information processing terminal 10 and the conference server apparatus 20 may be realized using a hardware configuration as shown in FIG. 2, for example.

FIG. 2 is a hardware configuration diagram of an exemplary computer system which makes up the conference system according to the present embodiment. The information processing terminal 10 in FIG. 2 includes an input apparatus 501, a display apparatus 502, an external I/F 503, a RAM 504, a ROM 505, a CPU 506, a communication I/F 507, an HDD 508, etc., which are mutually connected via a bus B. The information processing terminal 10 may be configured to include a camera, a microphone, a loudspeaker, etc.

The input apparatus 501, which includes a keyboard, a mouse, a touch panel, etc., is used to input the respective operation signals to the information processing terminal 10. The display apparatus 502, which includes a display, etc., displays results of processing by the information processing terminal 10. The communication I/F 507 is an interface which connects the information processing terminal 10 to a network N1. In this way, the information processing terminal 10 may conduct data communication with the conference server apparatus 20 via the communication I/F 507.

The HDD 508 is a non-volatile storage apparatus which stores therein programs and data. The programs and data stored include an OS which is basic software for controlling the overall information processing terminal 10, application software which provides various functions on the OS, etc.

The external I/F 503 is an interface with an external apparatus. The external apparatus includes a recording medium 503a, etc. In this way, the information processing terminal 10 may perform reading from and/or writing into the recording medium 503a via the external I/F 503. The recording medium 503a includes a flexible disk, a CD, a DVD, an SD memory card, a USB memory, etc.

The ROM 505 is a non-volatile semiconductor memory (storage apparatus) which may hold the program and the data even when the power is turned off. The ROM 505 stores therein data and programs for network setting, OS setting, and BIOS to be executed at the time of launching the information processing terminal 10. Moreover, the RAM 504 is a volatile semiconductor memory which temporarily holds data and programs.

The CPU 506 is an operation apparatus which reads the programs and the data from the storage apparatus such as the ROM 505 and the HDD 508 and executes processing to realize functions and overall control of the information processing terminal 10.

The information processing terminal 10 may execute programs using the hardware configuration as described above, for example, to realize various processes as described below.

The conference server apparatus 20 shown in FIG. 2 includes an input apparatus 601, a display apparatus 602, an external I/F 603, a RAM 604, a ROM 605, a CPU 606, a communication I/F 607, a HDD 608, etc., which are mutually connected via a bus B. The input apparatus 601 and the display apparatus 602 may take a form such that they are used with a connection therebetween as needed.

The input apparatus 601, which includes a keyboard, a mouse, etc., is used to input the respective operation signals to the conference server apparatus 20. The display apparatus 602, which includes a display, etc., displays results of processing by the conference server apparatus 20.

The communication I/F 607 is an interface which connects the conference server 20 to a network 14. The conference server apparatus 20 may conduct data communication with the information processing terminal 10 via the communication I/F 607.

The HDD 608 is a non-volatile storage apparatus which stores therein programs and data. The programs and data stored include an OS which is basic software for controlling the overall conference server apparatus 20, application software which provides various functions on the OS, etc.

The external I/F 603 is an interface with an external apparatus. The external apparatus includes a recording medium 603a, etc. In this way, the conference server apparatus 20 may perform reading from and/or writing into the recording medium 603a via the external I/F 603. The recording medium 603a includes a flexible disk, a CD, a DVD, an SD memory card, a USB memory, etc.

The ROM 605 is a non-volatile semiconductor memory (storage apparatus) which may hold programs and the data even when the power is turned off. The ROM 605 stores therein the data and programs for network setting, OS setting, and BIOS to be executed at the time of launching the conference server apparatus 20. The RAM 604 is a volatile semiconductor memory which temporarily holds data and programs.

The CPU 606 is an operation apparatus which reads the programs and the data from the storage apparatus such as the ROM 605 and the HDD 608 onto the RAM 604 and executes processing to realize functions and control of the overall conference server apparatus 20.

The conference server apparatus 20 may execute programs using the hardware configuration as described above, for example, to realize various processes as described below.

Software Configuration

Figure 3:
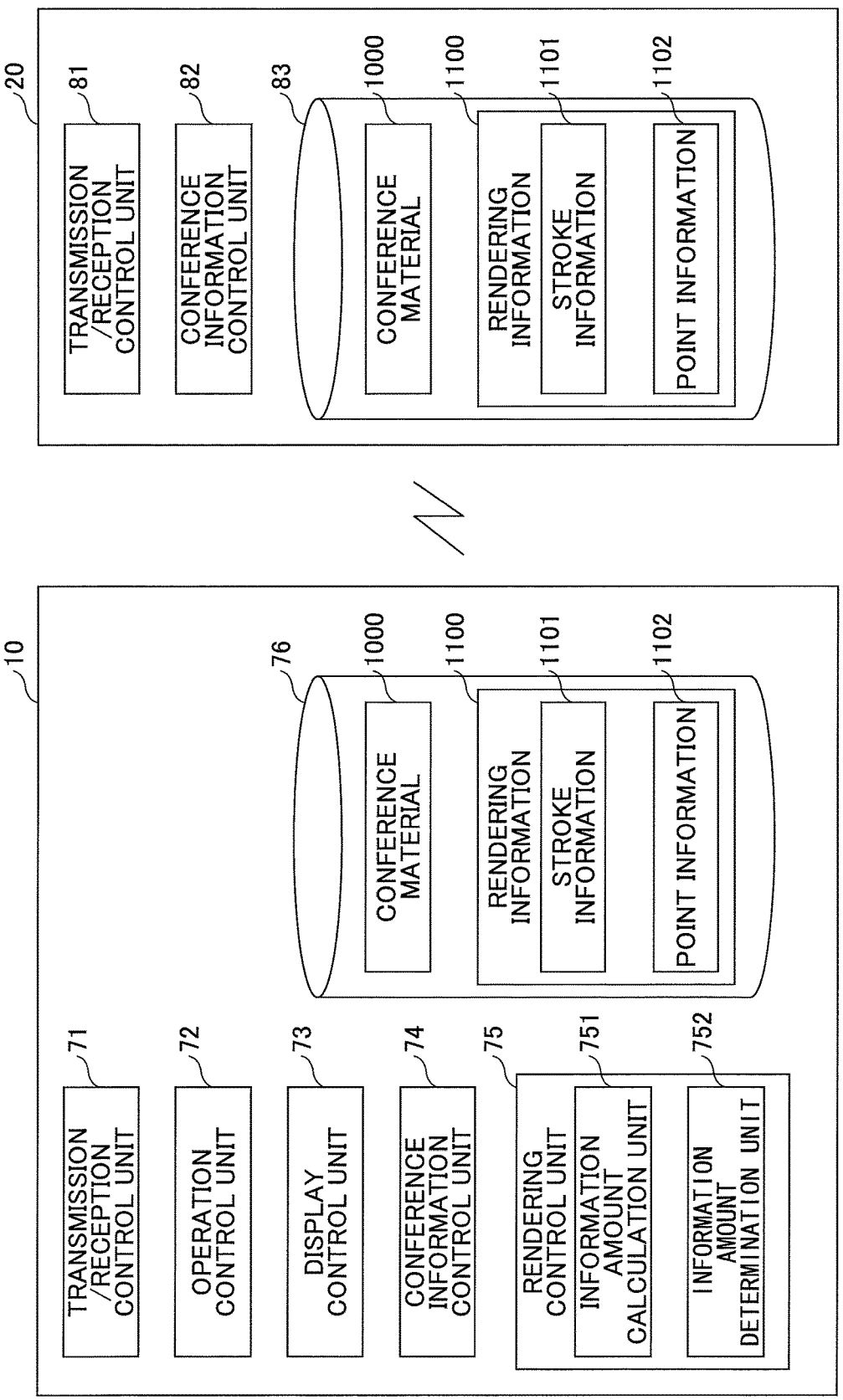
FIG. 3 is a functional diagram of the exemplary conference system according to the present embodiment.

The conference system 1 according to the present embodiment is realized using functional blocks shown in FIG. 3, for example. FIG. 3 is a functional block diagram of an exemplary conference system according to the present embodiment.

Information Processing Terminal 10

The information processing terminal 10 executes programs such as a conference application, etc., to realize a transmission/reception control unit 71, an operation control unit 72, a display control unit 73, a conference information control unit 74, a rendering control unit 75, and a conference information storage unit 76.

The transmission/reception control unit 71 performs a process of communicating with the conference server apparatus 20 via the communication I/F 507. The operation control unit 72 performs a process corresponding to an operation signal input to the input apparatus 501 by a user.

The display control unit 73 performs a process of outputting shared conference material to the display apparatus 502. Moreover, the display control unit 73 performs a process of causing memo writing to be displayed or a specified page to be displayed on the conference material in response to an operation such as the memo writing and page turning on the shared conference material.

The conference information control unit 74 causes rendering information, which is information on the memo writing on the conference material, or the conference material to be stored in the conference information storage unit 76. Moreover, if the operation such as the memo writing, the page turning, etc., is performed on the conference material, the conference information control unit 74 determines whether this operation is to be reflected in the other information processing terminals 10 (to be synchronously displayed with the other information processing terminals 10). In other words, the conference information control unit 74 determines whether the information processing terminal 10 is in the presenter mode and whether it is in the share mode.

The rendering control unit 75 controls whether the memo writing can be made on the conference material. The rendering control unit 75 includes an information amount calculation unit 751 and an information amount determination unit 752. The information amount calculation unit 751 calculates an information amount of the shared memo writing on the conference material (the memo writing shared by the respective information processing terminal 10). The information amount includes the number of points which make up the memo writing, for example. The information amount determination unit 752 determines whether the information amount calculated in the information amount calculation unit 751 is greater than or equal to a predetermined value.

The conference information storage unit 76 stores information on the conference. The information on the conference may be information including the conference material which includes electronic data such as the document, the chart, etc., for use in the conference; and rendering information, which is information on the memo writing on the conference material.

Conference Server Apparatus 20

The conference server apparatus 20 executes programs to realize a transmission and reception control unit 81, a conference information control unit 82, and a conference information storage unit 83.

The conference information storage unit 83 may be included in other server apparatuses, etc., which can conduct data transmission and reception with the conference server apparatus 20.

The transmission/reception control unit 81 performs a process of communicating with the information processing terminal 10 via the communication I/F 607. The conference information control unit 82 causes the conference material, and rendering information which is information on the memo writing on the conference material to be stored in the conference information storage unit 83. The conference information storage unit 83 stores information on the conference. The information on the conference may be information including the conference material which includes electronic data such as the document, the chart, etc., for use in the conference; and the rendering information, which is information on the memo writing on the conference material.

Rendering Information

Next, a data structure of rendering information stored by the conference information storage unit 76 of the information processing terminal 10 and the conference information storage unit 83 of the conference server apparatus 20 is described.

The rendering information may be information which includes stroke information and point information. FIG. 4 is a diagram for explaining one example of the stroke information.

The stroke information includes data items such as a stroke ID, a page number, a color, a thickness, etc. The stroke ID is an identifier which uniquely identifies the stroke information. The page number is a page number of the conference material on which a user made memo writing. The color is a color of the memo writing made on the conference material by the user. The thickness is a thickness of a line (a line segment or a curve) in the memo writing made on the conference material by the user.

FIG. 5 is a diagram for explaining one example of the point information. The point information includes data items such as point IDs, a stroke ID, an X coordinate, a Y coordinate, etc. The point IDs are identifiers, each of which uniquely identifies the point information. The stroke ID is a stroke ID which is associated with the point IDs. One stroke ID may be associated with two or more of the point IDs. The X coordinate and the Y coordinate are coordinates for a display screen of the information processing terminal 10.

These sets of stroke information and point information make it possible to represent the memo writing displayed with a line segment or a curve that is made on the conference material by the user. For example, a stroke ID "S00001" represents memo writing which includes a line segment with point IDs "P00001" and "P00002" as end points; a line segment with point IDs "P00002" and "P00003" as end points; a line segment with point IDs "P00003" and "P00004" as end points; and a line segment with point IDs "P00004" and "P00005" as end points that are rendered in color "black" and with thickness "thick" on page two of the conference material.

As described above, information (rendering information) on the memo writing made on the conference material by the user is stored in the conference information storage unit 76 of the information processing terminal 10 and the conference information storage unit 83 of the information processing terminal 20.

Conceptual Representations of the Process

Next, a conceptual representation of the process in the conference system according to the present embodiment is described with reference to the drawings.

Figure 6:
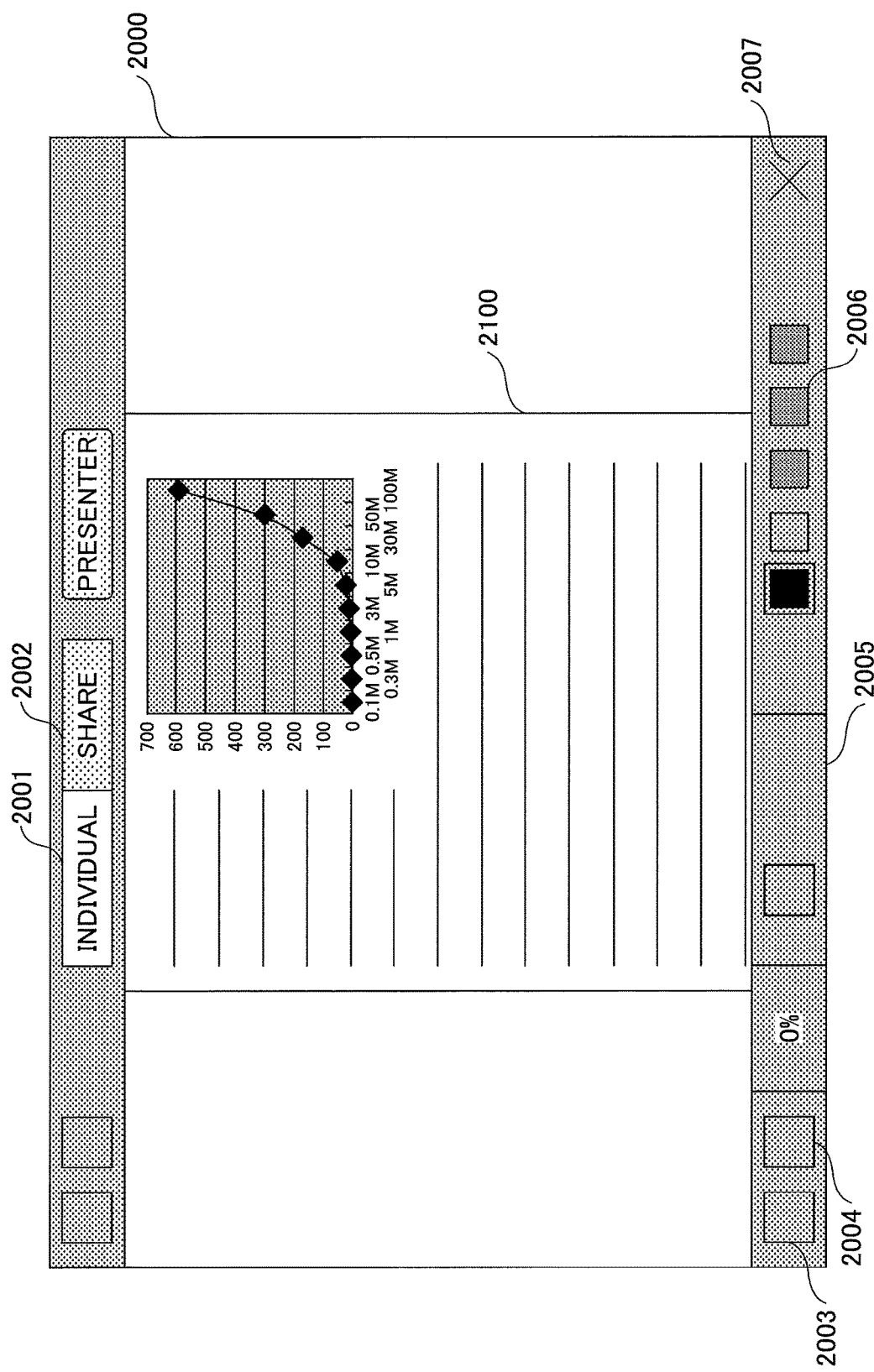
FIG. 6 is a conceptual diagram for an exemplary shared screen.

FIG. 6 is a conceptual diagram of one example of a shared screen. FIG. 6 shows a screen 2000 in which is shown conference material 2100 in a display screen of the information processing terminal 10 in the presenter mode (the information processing terminal 10 of the presenter). An individual mode button 2001 and a shared mode button 2002 are respectively buttons for switching to individual and share modes. For the share mode, an operation of memo writing, page turning, etc., that is performed in the information processing terminal 10 of the presenter is reflected in (synchronized with) the other information processing terminals 10 (the information processing terminals 10 of the participants). For the individual mode, an operation of memo writing, page turning, etc., that is performed in the information processing terminal 10 of the presenter is not reflected in (synchronized with) the other information processing terminals 10 (the information processing terminals 10 of the participants). The page turning may be realized by performing an operation of swiping, tapping, etc., on the conference material 2100 displayed on a touch panel, for example.

The memo writing on the conference material 2100 may be made using a desired operation on the touch panel, for example, after pressing down a memo writing button 2003. The memo writing may be deleted by tapping the memo writing on the touch panel, for example, after pressing down a memo deletion button 2004. Moreover, a desired line thickness or line color may be selected with a line thickness button 2005 or a line color button 2006 before (or while) pressing down the memo writing button 2003 to change the thickness or the color of the line segment of the memo writing.

Furthermore, a palette close button 2007 may be pressed down to not display a palette on which are displayed the memo writing button 2003, the memo deletion button, the line thickness button 2005, the line color button 2006, etc.

The below-described memo writing capacity 3001, the memo writing button 2003, the memo deletion button 2004, the line thickness button 2005, the line color button 2006, the palette close button 2007, etc., are merely examples of GUI components.

Figure 7:
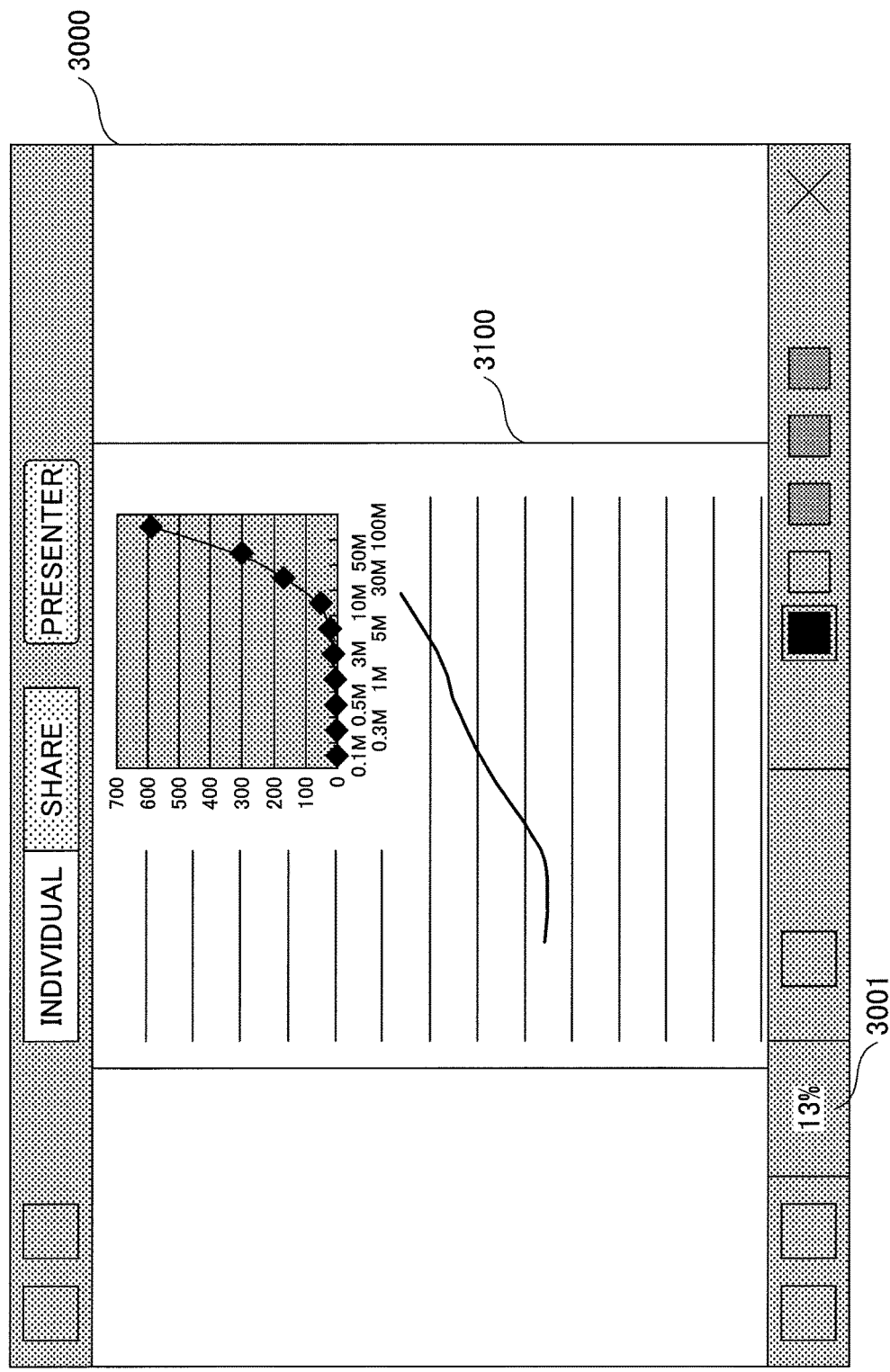
FIG. 7 is a conceptual diagram for exemplary memo writing.

Next, a case in which memo writing is made is described. FIG. 7 is a conceptual representation of one example of memo writing. FIG. 7 shows a screen 3000 in which is displayed conference material 3100 on which is made memo writing on a display screen of the information processing terminal 10 of the presenter. If the memo writing is made on the conference material displayed in the information processing terminal 10 of the presenter, this memo writing is also displayed in (synchronized with) the information processing terminal 10 of the participant.

When the memo writing is made by the user, a memo writing capacity 3001 changes (increases/decreases) in accordance with an information amount of the memo writing (the number of points which make up the memo writing). In an example in FIG. 7, the memo writing capacity 3001 is displayed as "13%" for the memo writing made on the conference material 3100. If this memo writing capacity 3001 reaches a predetermined value ("100%", for example), it would not be possible to make further memo writing. It is preferable that a value in accordance with the information amount for all memo writings made on the conference material is displayed for this memo writing capacity 3001; however, the memo writing capacity 3001 may be a value for each page.

While the memo writing capacity 3001 is displayed in a percentage in the example in FIG. 7, it is not limited thereto, so that a proportion on which the memo writing may be made may be shown in a pie chart or a bar chart, etc., for example. Moreover, it is not necessarily required to display the proportion for the memo writing capacity 3001; for example, "possible", which indicates that the memo writing can be made, and "not possible", which indicates that the memo writing can longer be made, etc., may be displayed. Moreover, the capacity for which the memo writing has already been made and the capacity for which the memo writing can be made may be displayed in quantitative representations.

Figure 8:
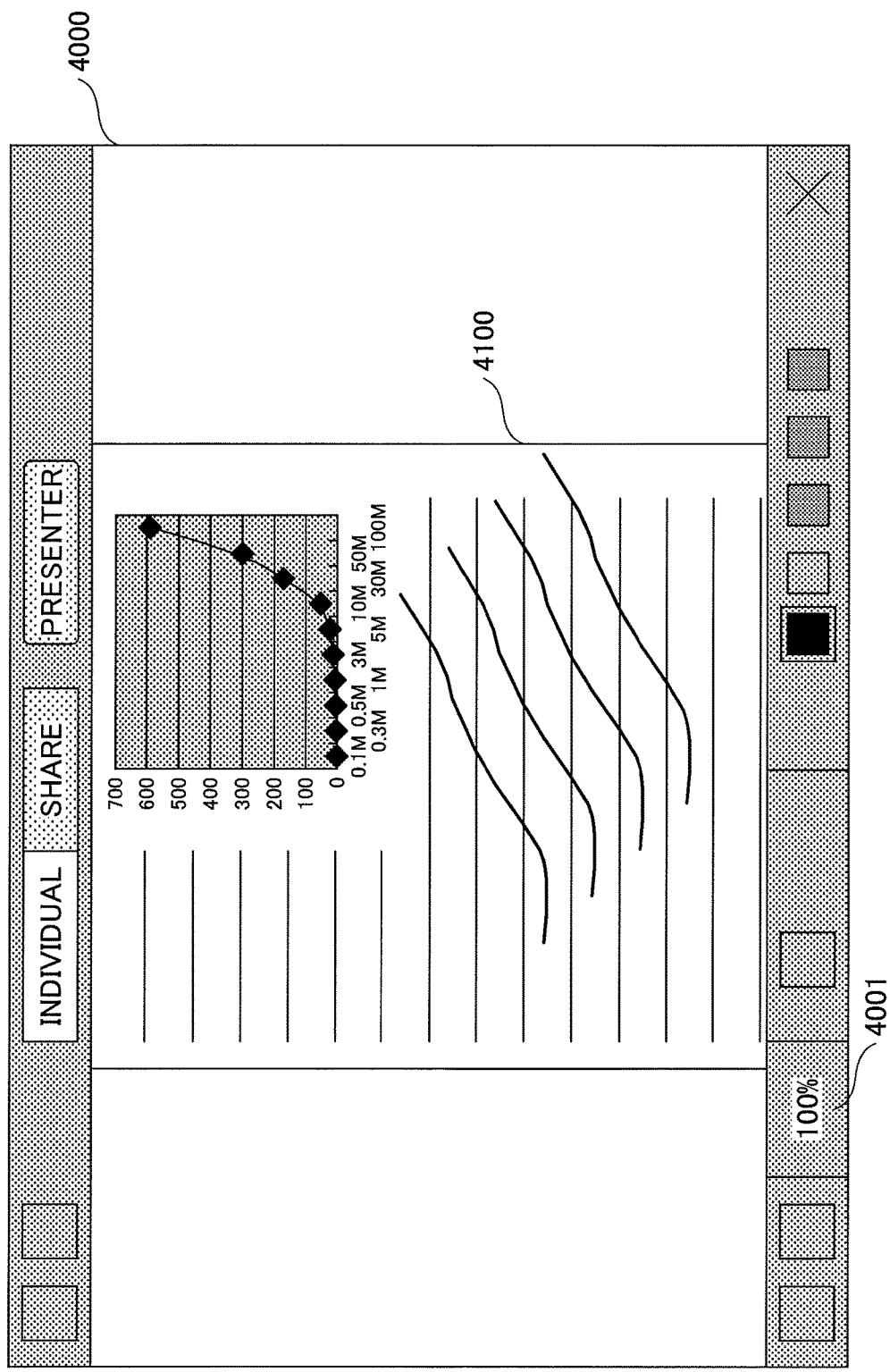
FIG. 8 is an exemplary conceptual diagram for a case in which the memo writing cannot be performed.

Next, a case is described in which the memo writing capacity 3001 reaches "100%", so that no further memo writing can be made. FIG. 8 is a conceptual representation of an example of a case in which no further memo writing can be made. FIG. 8 shows a screen 4000 in which is displayed conference material 4100 on which is made memo writing on a display screen of the information processing terminal 10 of the presenter.

In the example in FIG. 8, the memo writing capacity 4001 is "100%", so that no further memo writing can be made. Then, the memo writing button 2003 in FIG. 6, for example, cannot be pressed down. An error message or an alert message indicating that the memo writing cannot be made may be displayed if the memo writing button 2003 is pressed down or if an attempt for the memo writing is made.

If the memo writing capacity 4001 decreases (reaches below "100%", for example) as a result of deleting the memo writing using the memo deletion button 2004 in FIG. 6, for example, it is preferable to make it possible to make the memo writing again.

Details of the Process

Next, details of the process in the conference system 1 according to the present embodiment are described.

Figure 9:
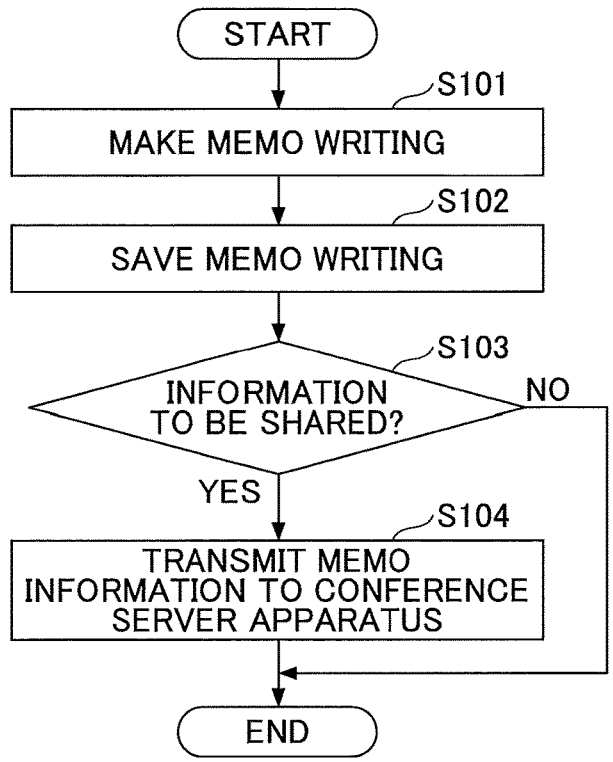
FIG. 9 is an exemplary flowchart of a process of memo writing by an information processing terminal of a presenter.

First, a process is described of making memo writing on the conference material displayed by the information processing terminal 10 of the presenter and transmitting information on the memo writing to the conference server apparatus 20. FIG. 9 is a flowchart of an example of a process of memo writing by the information processing terminal of the presenter.

In step S101, a user of the information processing terminal 10 of the presenter makes memo writing on conference material displayed via the input apparatus 501. Here, the operation control unit 72 accepts an operation from the input apparatus 501 and sends information on the operation accepted to the display control unit 73. Then, the display control unit 73 causes the display apparatus 502 of the information processing terminal 10 of the presenter to display the memo writing. When making the memo writing on the conference material, the user may specify a page in the conference material on which the memo writing is to be made and the thickness and the color of lines for the memo writing.

Then, the rendering control unit 75 determines whether the total information amount of the memo writing made by the user has reached a predetermined value, and if it reaches the predetermined value (has turned to a value which is greater than or equal to the predetermined value), a process of memo writing suppression which suppresses the memo writing is performed. Details of the process of memo writing suppression are described below.

In step S102, the conference information control unit 74 saves information (rendering information including stroke information and point information) on the memo writing made by the user in step S101 in the conference information storage unit 76. In accordance with whether the information processing terminal 10 is in the share mode or the individual mode, the conference information control unit 74 causes information on the memo writing made by the user in step S101 to be stored in a different area of the conference information storage unit 76.

In step S103, the conference information control unit 74 determines whether the memo writing made by the user in step S101 is memo writing made in the share mode of the information processing terminal 10 or memo writing made in the individual mode of the information processing terminal 10. If it is the memo writing made in the share mode, the process proceeds to step S104, while if it is the memo writing made in the individual mode, the process is completed.

In other words, as described in the next step, if the user of the information processing terminal 10 of the presenter makes the memo writing when the information processing terminal 10 is in the individual mode, the information (the rendering information including the stroke information and the point information) on this memo writing is not transmitted to the conference server apparatus 20. In other words, the memo writing made when the information processing terminal 10 was in the individual mode is not displayed in (synchronized with) the other information processing terminals 10 (the information processing terminals 10 of the participants).

In step S104, the transmission/reception control unit 71 transmits information (rendering information including stroke information and point information) on the memo writing made by the user in step S101 to the conference server apparatus 20.

As described above, if the user of the information processing terminal 10 of the presenter makes the memo writing on the conference material when the information processing terminal 10 is in the share mode, the information (the rendering information including the stroke information and the point information) on this memo writing may be transmitted to the conference server apparatus 20.

Figure 10:
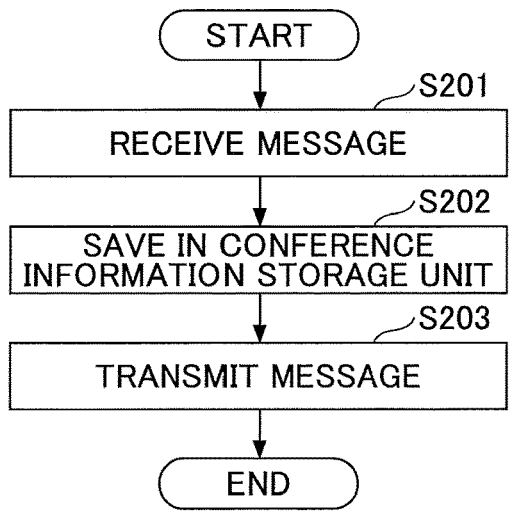
FIG. 10 is an exemplary flowchart of a process of receiving a message from an information processing terminal in a conference server apparatus.

Next, a process is described for a case in which the conference server apparatus 20 receives a message from the information processing terminal 10. FIG. 10 is a flowchart of one example of a process of message reception from an information processing terminal in a conference server apparatus. Below, as one example, a case is described in which the conference server apparatus 20 receives a message including information (rendering information including stroke information and point information) on the memo writing from the information processing terminal 10 of the presenter.

In step S201, the transmission/reception control unit 81 receives a message including rendering information transmitted from the information processing terminal 10 of the presenter.

In step S202, the conference information control unit 82 obtains rendering information from a received message and causes it to be stored in the conference information storage unit 83.

In step S203, the transmission/reception control unit 81 transmits a message including rendering information to the information processing terminal 10 of the participant.

As described above, the conference server apparatus 20 may transmit rendering information included in the message received from the information processing terminal 10 of the presenter to the information processing terminal 10 of the participant.

Moreover, the conference server apparatus 20 may cause the rendering information included in the message received from the information processing terminal 10 of the presenter to be stored in the conference information storage unit 83. In this way, the information processing terminal 10 which starts participating in the middle of the conference may obtain (download) the conference material 1000 and the rendering information 1100 from the conference server apparatus 20 to display the conference material in which the memo writing is reflected.

Figure 11:
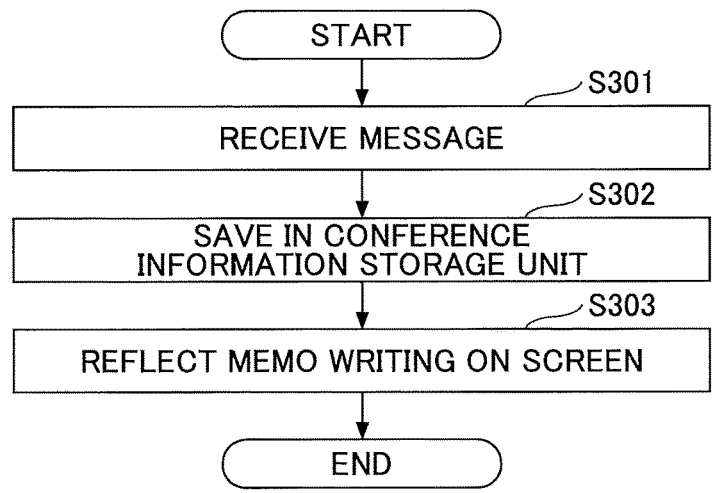
FIG. 11 is an exemplary flowchart of a process of synchronous displaying from the conference server apparatus in the information processing terminal of a participant.

Next, a process is described for a case in which the information processing terminal 10 receives a message from the conference server apparatus 20. FIG. 11 is a flowchart of one example of a process of synchronous displaying from the conference server apparatus in the information processing terminal of a participant. Below, as one example, a case is described in which the information processing terminal of the participant receives a message including information (rendering information including stroke information and point information) on the memo writing from the conference server apparatus 20.

In step S301, the transmission/reception control unit 71 receives a message including rendering information transmitted from the conference server apparatus 20.

In step S302, the conference information control unit 74 obtains rendering information from a received message and causes it to be stored in the conference information storage unit 76.

In step S303, based on rendering information obtained, the display control unit 73 causes the memo writing to be displayed on (reflected in) the conference material displayed.

As described above, the information processing terminal 10 of the participant may receive a message including rendering information from the conference server apparatus 20 and displays (synchronizes) the memo writing based the rendering information obtained from this message. In this way, the memo writing made by the information processing terminal of the presenter may be caused to be synchronously displayed on the information processing terminal 10 of the participant.

Figure 12:
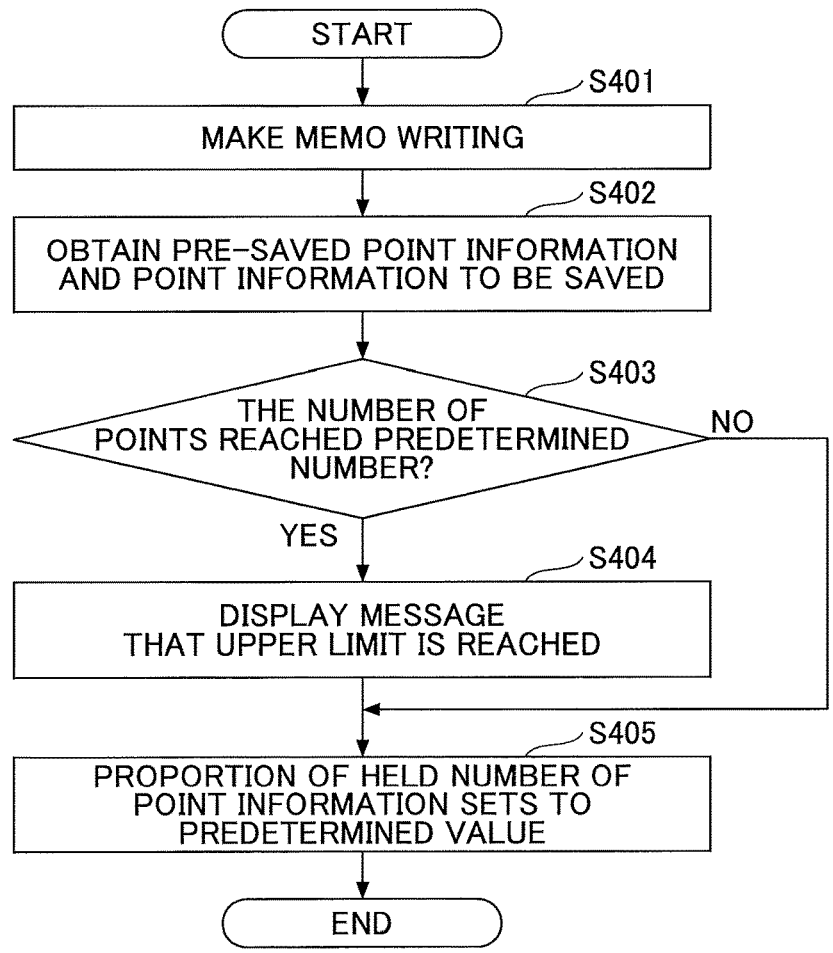
FIG. 12 is a flowchart of an exemplary memo writing suppression process.

Next, a process is described of determining an information amount of memo writing when a user of the information processing terminal 10 of the presenter makes the memo writing and suppressing the memo writing in a predetermined case. FIG. 12 is a flowchart of one example of a memo writing suppression process.

The process in step S401 is the same as that in step S101, so that repeated explanations will be omitted.

In step S402, the conference information control unit 74 obtains point information 1102 included in rendering information 1100 from the conference information storage unit 76. Then, the information amount calculation unit 751 calculates the number of points (information amount) from the point information 1102 obtained by the conference information control unit 74 and point information for the memo writing made by the user of the information processing terminal 10 of the presenter in step S401. In other words, the information amount calculation unit 751 calculates the total value of the number of points that is stored as the point information 1102 (the number of data items for the point information 1102) and the number of points which make up the memo writing made in step S401. This makes it possible to calculate the number of points which make up the memo writing on the conference material shared among the information processing terminals 10.

While the information amount is set to be the total value of the number of points which make up the memo writing according to the present embodiment, it is not limited thereto. For example, as the information amount, a data amount shown in bits, bytes, etc., may be used.

In step S403, the information amount determination unit 752 determines whether the total value of the number of points calculated in step S402 has reached a predetermined value. If the total value of the number of points has reached the predetermined value, the process proceeds to step S404, and, if it has not reached the predetermined value, the process proceeds to step S405. The predetermined value may be set as the number of points of 2500, etc., for example. Moreover, it may be arranged for this value to be able to be set by an administrator, etc., of a conference system 1, for example.

In step S404, the rendering control unit 75 causes a message indicating that no more memo writing can be made to be displayed via the display control unit 73. Moreover, at this time, the rendering control unit 75 may cause the memo writing button 2003 to be not displayed or not selectable such that further memo writing cannot be made, for example. Moreover, a cursor may be caused to automatically transition to the memo deletion button 2004 and the memo writing may be deleted to cause a message that memo writing cannot be made to be continually displayed until the total value of the number of points falls below a predetermined value.

In step S405, the conference information control unit 74 saves information (rendering information including stroke information and point information) on the memo writing made in step S401. Moreover, for the number of points that is saved in the conference information storage unit 76, the rendering control unit 75 calculates the proportion thereof to the predetermined value and causes the calculated proportion to be displayed as the memo writing capacity 3001 (the memo writing capacity 4001) as a percentage, for example.

The process of the above-described steps S401-S405 is applicable even if the user of the information processing terminal 10 in the individual mode makes the memo writing.

As described above, it is made possible for the information processing terminal 10 to prevent further memo writing from being made if the information amount of the memo writing on the conference material reaches at least a predetermined value. This makes it possible to control the amount (the information amount) of memo writing which can be made on the conference material. Therefore, information (rendering information) on memo writing that is obtained by the user who joins a conference in the middle thereof, for example, may be reduced. Moreover, the processing burden of the information processing terminal 10 and the network N1 may be reduced.

SUMMARY

The conference system 1 according to the present embodiment may cause user operations such as memo writing and page turning, etc., to be reflected in the information processing terminal 10 of the participant and synchronous displaying among the respective information processing terminals 10.

Moreover, the conference system 1 according to the present embodiment makes it possible to suppress a new memo writing operation on the memo writing in the conference material of the information processing terminal 10 based on the information amount of the memo writing. In this way, a large amount of memo writing made on the conference material may be prevented, making it possible to suppress an amount of data to be obtained (downloaded) by the information processing terminal 10 of the user which joins the conference in the middle thereof, for example.

The present invention can be implemented in any convenient form, for example using dedicated hardware, or a mixture of dedicated hardware and software. The present invention may be implemented as computer software implemented by one or more networked processing apparatuses. The network can include any conventional terrestrial or wireless communications network, such as the Internet. The processing apparatuses can include any suitably programmed apparatuses such as a general-purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD-ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The present invention is not limited to the above described embodiments which are specifically disclosed, so that various changes and modifications thereto are possible without departing from the scope of the present invention.

The present application is based on and claims the benefit of priority of Japanese Priority Application No. 2013-237752 filed on Nov. 18, 2013, the entire contents of which is hereby incorporated by reference.

What is claimed is:

1. An information processing terminal, wherein display data to be displayed on a display screen of the information processing terminal can be shared among multiple information processing terminals, the information processing terminal comprising:
   a memory storing computer-readable instructions; and
   a processor configured to execute the computer-readable instructions to,
   cause at least one GUI component selectable by a user for performing rendering to be displayed on the display screen of the information processing terminal;
   render information on the display data of the information processing terminal based on an operation of the user selecting the at least one GUI component;

transmit, via a server apparatus, first rendering information to at least one information processing terminal of the multiple information processing terminals other than the information processing terminal to cause the rendered information to be synchronously displayed on the display data on a display screen of the at least one information processing terminal, wherein the first rendering information includes first stroke information and first point information;

receive, via the server apparatus, second rendering information from one of the multiple information processing terminals other than the information processing terminal, wherein the second rendering information includes second stroke information and second point information;

calculate an information amount corresponding to a total number of points based on the first point information of the first rendering information and the second point information of the second rendering information;

render information on the display data of the information processing terminal based on the second rendering information in response to the calculated information amount being less than a threshold capacity value corresponding to a certain number of points;

suppress rendering of information on the display data of the information processing terminal in response to the calculated information amount being greater than or equal to the threshold capacity value, wherein suppressing the rendering includes preventing the user from selecting the at least one GUI component;

delete at least some of the rendered information on the display data of the information processing terminal based on another operation of the user;

transmit, via the server apparatus, deletion information to the at least one information processing terminal to cause the deleted information to be synchronously deleted from the display data displayed on the display screen of the at least one information processing terminal, wherein the deletion information includes third stroke information and third point information;

recalculate the information amount based on a difference between the total number of points corresponding to the first rendering information and the second rendering information and a number of points corresponding to the third point information of the deletion information;

enable rendering of information on the display data of the information processing terminal in response to the recalculated information amount being less than the threshold capacity value, wherein enabling the rendering includes allowing the user to select the at least one GUI component; and cause another GUI component indicating a memo writing capacity that changes in accordance with the calculated information amount and the recalculated information amount to be dynamically displayed on the display screen of the information processing terminal, wherein the memo writing capacity indicates at least one of a proportion, a percentage, or a quantitative representation of the calculated information amount and the recalculated information amount relative to the threshold capacity value.

2. The information processing terminal as claimed in claim 1, wherein the processor is further configured to execute the computer-readable instructions to acquire the display data and the information rendered on the display data when sharing the display data with the at least one information processing terminal is started.

3. The information processing terminal as claimed in claim 1, wherein the rendering renders a line segment or a curve on the display data of the information processing terminal based on the operation of the user.

4. The information processing terminal as claimed in claim 3, wherein the information amount is calculated based on a number of points which make up the line segment or the curve.

5. The information processing terminal as claimed in claim 1, wherein in response to the rendering of information on the display data of the information processing terminal being suppressed, the processor is further configured to execute the computer-readable instructions to cause a cursor to be automatically transitioned to a GUI component operable by the user to delete at least some of the rendered information.

6. An information processing method for use in an information processing terminal, wherein display data to be displayed on a display screen of the information processing terminal can be shared among multiple information processing terminals, the information processing method comprising:

causing at least one GUI component selectable by a user for performing rendering to be displayed on the display screen of the information processing terminal;

rendering information on the display data of the information processing terminal based on an operation of the user selecting the at least one GUI component;

transmitting, via a server apparatus, first rendering information to at least one information processing terminal of the multiple information processing terminals other than the information processing terminal to cause the rendered information to be synchronously displayed on the display data on a display screen of the at least one information processing terminal, wherein the first rendering information includes first stroke information and first point information;

receiving, via the server apparatus, second rendering information from one of the multiple information processing terminals other than the information processing terminal, wherein the second rendering information includes second stroke information and second point information;

calculating an information amount corresponding to a total number of points based on the first point information of the first rendering information and the second point information of the second rendering information;

rendering information on the display data of the information processing terminal based on the second rendering information in response to the calculated information amount being less than a threshold capacity value corresponding to a certain number of points;

suppressing rendering of information on the display data of the information processing terminal in response to the calculated information amount being greater than or equal to the threshold capacity value, wherein the suppressing includes preventing the user from selecting the at least one GUI component;

deleting at least some of the rendered information on the display data of the information processing terminal based on another operation of the user;

transmitting, via the server apparatus, deletion information to the at least one information processing terminal to cause the deleted information to be synchronously deleted from the display data displayed on the display screen of the at least one information processing terminal, wherein the deletion information includes third stroke information and third point information;

recalculating the information amount based on a difference between the total number of points corresponding to the first rendering information and the second rendering information and a number of points corresponding to the third point information of the deletion information;

enabling rendering of information on the display data of the information processing terminal in response to the recalculated information amount being less than the threshold capacity value, wherein enabling the rendering includes allowing the user to select the at least one GUI component; and causing another GUI component indicating a memo writing capacity that changes in accordance with the calculated information amount and the recalculated information amount to be dynamically displayed on the display screen of the information processing terminal, wherein the memo writing capacity indicates at least one of a proportion, a percentage, or a quantitative representation of the calculated information amount and the recalculated information amount relative to the threshold capacity value.

7. The information processing method as claimed in claim 6, further comprising acquiring the display data and the information rendered on the display data when sharing the display data with the at least one information processing terminal is started.

8. The information processing method as claimed in claim 6, wherein,
the rendering renders a line segment or a curve on the display data of the information processing terminal based on the operation of the user, and
the information amount is calculated based on a number of points which make up the line segment or the curve.

9. The information processing method as claimed in claim 6, further comprising, in response to the suppressing, causing a cursor to be automatically transitioned to a GUI component operable by the user to delete at least some of the rendered information.

10. An information processing system including a plurality of information processing terminals and a server apparatus, wherein display data to be displayed on a display screen of a first information processing terminal can be shared among multiple of the plurality of information processing terminals, the information processing system comprising:
at least one memory storing computer-readable instructions; and
at least one processor configured to execute the computer-readable instructions to,
cause at least one GUI component selectable by a user for performing rendering to be displayed on the display screen of the first information processing terminal;
render information on the display data of the first information processing terminal based on an operation of the user selecting the at least one GUI component;
transmit, via the server apparatus, first rendering information to at least one information processing terminal of the plurality of information processing terminals other than the first information processing terminal to cause the rendered information to be synchronously displayed on the display data on a display screen of the at least one information processing terminal, wherein the first rendering information includes first stroke information and first point information;
receive, via the server apparatus, second rendering information from one of the plurality of information processing terminals other than the first information processing terminal, wherein the second rendering information includes second stroke information and second point information;
calculate an information amount corresponding to a total number of points based on the first point information of the first rendering information and the second point information of the second rendering information;
render information on the display data of the first information processing terminal based on the second rendering information in response to the calculated information amount being less than a threshold capacity value corresponding to a certain number of points;
suppress rendering of information on the display data of the first information processing terminal in response to the calculated information amount being greater than or equal to the threshold capacity value, wherein suppressing the rendering includes preventing the user from selecting the at least one GUI component;
delete at least some of the rendered information on the display data of the first information processing terminal based on another operation of the user;
transmit, via the server apparatus, deletion information to the at least one information processing terminal to cause the deleted information to be synchronously deleted from the display data displayed on the display screen of the at least one information processing terminal, wherein the deletion information includes third stroke information and third point information;
recalculate the information amount based on a difference between the total number of points corresponding to the first rendering information and the second rendering information and a number of points corresponding to the third point information of the deletion information;
enable rendering of information on the display data of the first information processing terminal in response to the recalculated information amount being less than the threshold capacity value, wherein enabling the rendering includes allowing the user to select the at least one GUI components; and
cause another GUI component indicating a memo writing capacity that changes in accordance with the calculated information amount and the recalculated information amount to be dynamically displayed on the display screen of the first information processing terminal, wherein the memo writing capacity indicates at least one of a proportion, a percentage, or a quantitative representation of the calculated information amount and the recalculated information amount relative to the threshold capacity value.

11. The information processing system as claimed in claim 10, wherein the at least one processor is further configured to execute the computer-readable instructions to acquire the display data and the information rendered on the display data when sharing the display data with the at least one information processing terminal is started.

12. The information processing system as claimed in claim 10, wherein,
- the rendering renders a line segment or a curve on the display data of the first information processing terminal based on the operation of the user, and
- the information amount is calculated based on a number of points which make up the line segment or the curve.

13. The information processing system as claimed in claim 10, wherein in response to the rendering of information on the display data of the first information processing terminal being suppressed, the at least one processor is further configured to execute the computer-readable instructions to cause a cursor to be automatically transitioned to a GUI component operable by the user to delete at least some of the rendered information.

* * * * *